United States Patent [19]

Jesinger

[11] Patent Number: 5,193,953
[45] Date of Patent: Mar. 16, 1993

[54] HIGH-SPEED DRILLING OR MILLING SPINDLE

[75] Inventor: Richard Jesinger, Esslingen, Fed. Rep. of Germany

[73] Assignee: Fortuna-Werke Maschinenfabrik GmbH, Fed. Rep. of Germany

[21] Appl. No.: 744,084

[22] Filed: Aug. 12, 1991

[30] Foreign Application Priority Data

Aug. 13, 1990 [DE] Fed. Rep. of Germany ....... 4025610

[51] Int. Cl.$^5$ .................. B23C 9/00; F16C 230/00
[52] U.S. Cl. .................. 409/231; 51/165.77; 310/90.5; 384/228; 384/248
[58] Field of Search ............ 409/231; 408/8, 13, 408/11; 310/90.5; 384/227, 228, 603, 240, 243, 248, 446; 51/134.5 R, 165.77

[56] References Cited

U.S. PATENT DOCUMENTS

| | | |
|---|---|---|
| 3,731,984 | 5/1973 | Habermann . |
| 4,080,012 | 3/1978 | Boden et al. .............. 310/90.5 |
| 4,180,946 | 1/1980 | Heijkenskjold et al. ...... 310/90.5 X |
| 4,514,123 | 4/1985 | Johnstone et al. ............ 409/231 |
| 4,879,500 | 11/1989 | Kanemitsu ................... 310/90.5 X |
| 4,928,561 | 5/1990 | Fouche ........................ 310/90.5 X |
| 4,956,945 | 9/1990 | Ooshima ...................... 51/165.77 |
| 5,027,280 | 6/1991 | Ando ........................... 51/134.5 R |

FOREIGN PATENT DOCUMENTS

| | | | |
|---|---|---|---|
| 8245 | 1/1986 | Japan | 409/231 |
| 2115082 | 9/1983 | United Kingdom | 310/90.5 |
| 2166374 | 9/1984 | United Kingdom | . |

OTHER PUBLICATIONS

"High Speed Electro spindle with Magnetic Bearing", Bulletin of T.M.I. Forest, publ. Nov. 1979.
Pamphlet of the applicant "Belt-driven Spindles".

*Primary Examiner*—William Briggs
*Attorney, Agent, or Firm*—Walter A. Hackler

[57] ABSTRACT

A high-speed drilling or milling spindle (10) comprises a stator (11) that can be attached to a machine tool (12), a rotor (13), and a rotary drive (40, 41) acting between stator (11) and rotor (13). The rotor (13) has a receptacle (15) for a rotating, metal-cutting tool (16). The rotor (13) is supported with respect to the stator (11) by means of at least a first and a second rolling bearing (22, 32) spaced axially away therefrom. The rotor (13) is supported on thrust and radial bearings. The rolling bearings (22, 32) have a very small thrust angle (24, 34). They essentially act as radial bearings. A third bearing is provided as the thrust bearing in the form of a magnetic bearing (50). The magnetic bearing (50) is adjustable in terms of its axial bearing force as a function of the axial forces ($F_a$) acting on the tool (16).

6 Claims, 1 Drawing Sheet

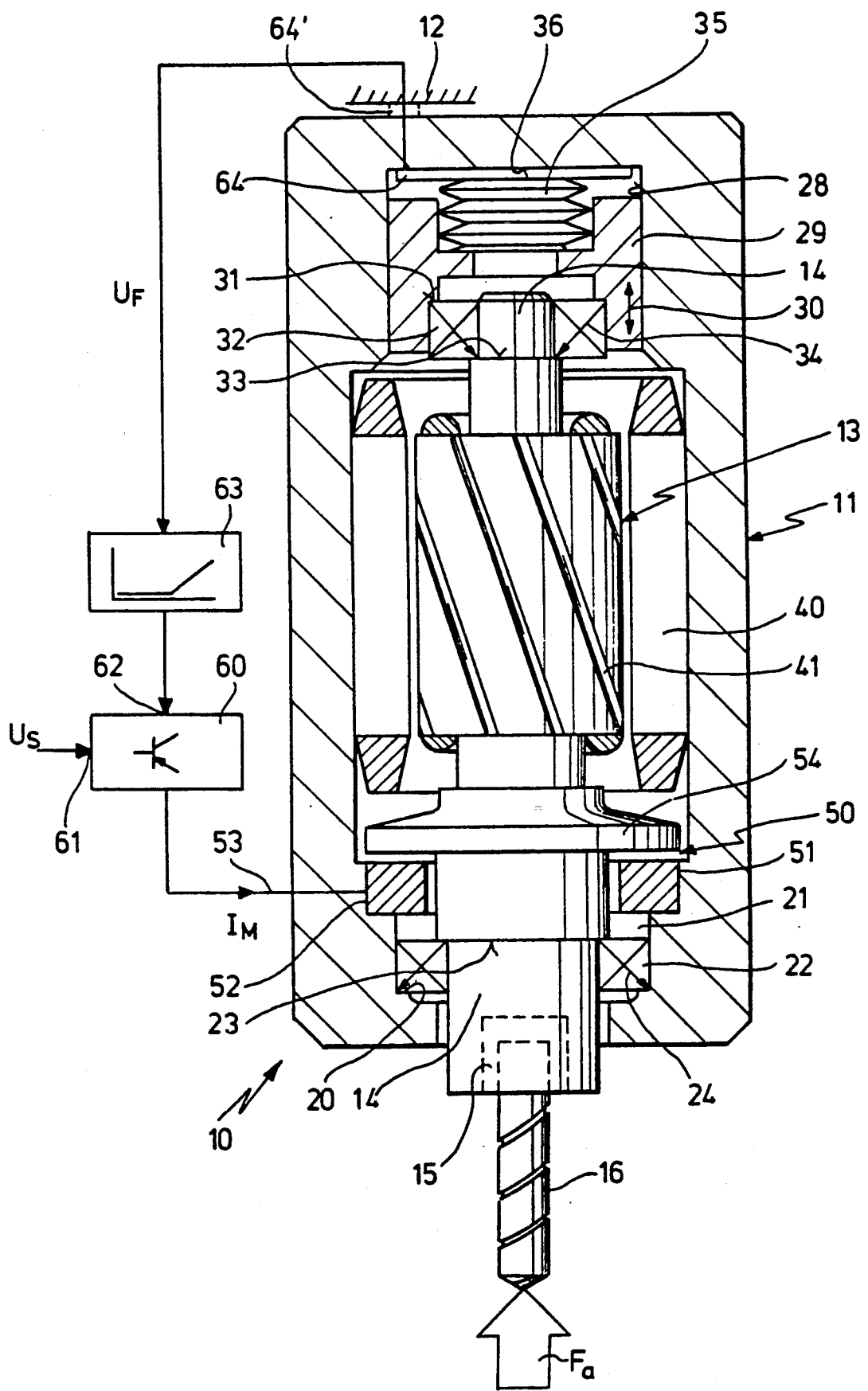

HIGH-SPEED DRILLING OR MILLING SPINDLE

The invention relates to a high-speed drilling or milling spindle with a stator that can be attached to a machine tool, with a rotor, and with a rotary drive acting between stator and rotor, with the rotor having a receptacle for a rotating, metal-cutting tool and being supported with respect to the stator by means of at least a first and a second rolling bearing spaced axially away therefrom, and further with the rotor being supported on thrust and radial bearings.

Milling spindles of the aforesaid type are generally known, for example from GB-OS 2 166 374 or as products of the applicant with the model designations FA or FAV.

In the known milling spindles, the rolling bearings are naturally designed for very high operating speeds, which can be on the order of a speed factor (product of the average bearing diameter times speed) of up to $3.5 \times 10^6$ mm $\times$ min$^{-1}$. In this operating range, however, there is no rolling bearing that can act as a thrust bearing assembly for the rotor. Although at very high speeds the weight of the bearing assembly naturally lies on the radial bearing assembly, in drilling and milling spindles there is the special circumstance that considerable axial forces can additionally occur, exerted on the tool by the workpiece being machined. This differentiates the present operating application from others in which comparatively very small axial forces occur, for example in drives for centrifuges, fans, and many others.

Moreover, more and more machining techniques that have become familiar under the abbreviation HSC (high-speed cutting) are becoming established in the machine tool industry. With these machining techniques, the material of the workpiece is cut in a non-solid phase as a result of extremely high cutting speeds. However, this requires the aforesaid very high tool rotation speeds.

Since on the other hand there remains a need, as is generally the case in the machine tool industry, to remove continually greater volumes of material per unit time, the inevitable result is also a considerable increase in operative axial forces.

In high-speed drilling or milling spindles, however, the axial load carrying capacity very quickly reaches a limit, since the rolling bearings used are either optimized radially in order to allow extremely high speeds, but then cannot bear loads in the axial direction; or they are optimized axially and can handle high axial forces, but have corresponding failings in terms of radial bearing capacity and thus quickly reach a rotation speed limit.

Although it has already been proposed to work at very high speeds with air bearings, and although it is also a known practice from U.S. Pat. No. 3,731,984, in an ultracentrifuge, to support those rotating elements of the centrifuge that are supported in the vertical axis in magnetic thrust bearings at the top and the bottom end of the drive shaft, nevertheless no consideration is given therein to the fact that no significant axial forces occur in ultracentrifuges, and all that is being provided is a bearing adjustment system for the rotating elements in the vertical axis.

In addition, it is of primary importance with drilling and milling spindles to retain proven rolling bearings for radial support of the rotor.

SUMMARY OF THE INVENTION

The object on which the invention is based is therefore that of developing a high-speed drilling or milling spindle of the aforesaid type in such a way that even high axial forces, especially such as those which occur with insertion processes during milling, can be handled.

According to the present invention, this object is achieved by the fact that the rolling bearings have a very small thrust angle, so that they essentially act as radial bearings; that a third bearing is provided as the thrust bearing in the form of a magnetic bearing; and that the magnetic bearing is adjustable in terms of its axial bearing force as a function of the axial forces acting on the tool.

The object upon which the invention is based is completely achieved in this manner.

Specifically, according to the present invention a hybrid bearing is used, in which both rolling bearings (for radial support) and at least one magnetic bearing (for axial support) cooperate in an optimal manner. For example, the rolling bearings can be given an extremely small thrust angle, since in the spindle according to the present invention the rolling bearings act almost exclusively as radial bearings, and do not need to absorb any forces axially. Axial distortion of the rotor, with corresponding loading of the bearing elements of the rolling bearing, is also prevented thereby, since a special component, namely the magnetic bearing, is provided in order to handle axial forces. Lastly the utilization of a magnetic bearing has the additional advantage that the bearing force generated by the magnetic bearing can be suitably adjusted as a function of the operation of the axial force, although in most cases no adjustment is necessary, since axial forces for a certain machining step are predictable. This also differentiates the spindle according to the present invention from general drives, in which all that was provided was a bearing adjustment system, with no need to absorb particular axial forces.

In a preferred embodiment of the spindle according to the present invention, the first rolling bearing at the tool end of the rotor is configured as a locating bearing, and the second rolling bearing at the opposite end of the rotor is configured as a non-locating bearing, with the second bearing being braced against the force of an elastic element against the stator.

This feature has the advantage that the rotor can be supported in an axially elastic manner, so that the axial force acting from outside can be compensated for within the elasticity range of the elastic element. In addition, the locating bearing at the front end guarantees that the stator retains the rotor at the front.

In the practical example mentioned above the elastic element is preferably a spring, especially in the form of a bellows.

This feature has the advantage that a particularly simple design is achieved, with the bellows also capable of performing a sealing function.

Lastly, practical examples of the invention are especially preferred in which a sensor is provided to detect the axial force exerted on the tool, and the sensor is connected via a parameter stage to a control unit for the magnetic bearing, which above a predetermined axial force threshold value applies a bearing force, oriented opposite to the axial force, which increases, preferably proportionally, with the axial force.

This feature has the advantage that practical requirements are taken into account, since for low axial forces conventional operation without magnetic compensation is selected, while only if a certain threshold value is exceeded will a counteracting force be applied, which increases with the operative axial force, preferably in a controlled manner.

Further advantages are evident from the description of the attached drawing.

It is obvious that the features described above and those yet to be explained below can be used not only in the particular combination indicated, but also in other combinations or in isolation, without leaving the context of the present invention.

A practical example of the invention is illustrated in the drawing and will be explained in more detail in the description which follows.

BRIEF DESCRIPTION OF THE DRAWINGS

The single FIGURE shows a practical example of a high-speed drilling or milling spindle according to the present invention, in a lateral sectioned view.

DETAILED DESCRIPTION

In the FIGURE, 10 designates a milling or drilling spindle of outwardly conventional type. The spindle 10 has a stator 11, for example in the form of a cylindrical housing. The stator is usually mounted in a stationary manner in a suitable receptacle of a machine tool, indicated very schematically at 12.

A rotor 13 is rotatably arranged in the stator 11. The rotor 13 has a continuous shaft 14. The shaft 14 is provided on its end surface with a clamping apparatus 15 (indicated only schematically) for a tool 16, for example a drill bit.

The bearing support for the rotor 13 in the stator 11 is as follows:

A shoulder 20 exists in a cavity 21 of the stator 11 in which the rotor 13 rotates. Braced against the shoulder 20 is a radial rolling bearing 22, which at the other end contacts a shoulder 23 of the shaft 14. The radial rolling bearing 22 is thus a locating bearing.

An arrow 24 indicates the thrust angle of the radial rolling bearing 22 (angular contact ball bearing). The thrust angle is very small, and is preferably in the range of a few degrees (usually 12°-18°).

At the upper end (in the FIGURE) of the stator 11, the cavity 21 is configured as a cylindrical inner wall 28. A cylindrical slider 29 is guided in an axially movable manner, as indicated by a double arrow 30, on this inner wall 28.

The slider 29 is provided with a shoulder 31, against which is braced a second radial rolling bearing 32. At the other end the second radial rolling bearing 32 contacts a shoulder 33 of the shaft 14, which faces the opposite way from the first shoulder 23. An arrow 34 again symbolizes the very small thrust angle for the second radial rolling bearing 32.

Lastly, the slider 29 is braced against one end surface 36 of the stator 11 by means of an elastic element in the form of a bellows 35.

The rotor 13 is supported on bearings at both ends by the fact that a drive system, consisting of a stator winding 40 on the stator 11 and a rotor winding 41 on the rotor 13 are arranged between the radial rolling bearings 22 and 32. For simplicity's sake, the electrical leads, control units, and the like for this rotary drive are not shown in the FIGURE.

Thrust bearing support for the rotor 13 is provided by a magnetic bearing 50, which in the FIGURE is arranged just above the first, lower radial rolling bearing 22. The magnetic bearing 50 consists essentially of a magnet coil 51 that is braced in a stationary manner on a further shoulder 52 of the cavity 21, and of a permanent magnet 54 which is fastened axially to the shaft 14 at a short distance from the magnet coil 51.

From the magnet coil 51, a lead 53 runs to a control unit 60 that delivers a magnetization current $I_M$ to the magnet coil 51. The control unit 60 is equipped with a first input 61 and/or a second input 62. An external control command in the form of a control voltage $U_S$ can be conveyed to the control unit 60 via the first input 61.

The second input 62 is connected to a parameter stage 63, to the input of which a voltage $U_F$ is conveyed. The voltage $U_F$ is the signal voltage of a force sensor 64, and constitutes as indication of an axial force $F_a$ that is being exerted by a workpiece on the tool 16.

The force sensor 64 can, for example, be arranged in the cavity 21, as depicted in the FIGURE with solid lines; but it can also be located outside the stator 11 between the latter and the stationary machine tool 12, as indicated with dot-dash lines at 64'.

In the first case the slider 29 presses on the force sensor 64, while in the second case the stator 11, which is supported in an axially displaceable manner, is pressed by means of force sensor 64' against the stationary machine tool 12 when the workpiece exerts the axial force $F_a$ on the tool 16.

The spindle illustrated in the FIGURE operates as follows:

When a tool 16 has been clamped in the clamping apparatus 15, the machine tool 12 moves the spindle 10 to a workpiece. Especially during the insertion movement of the tool 16 into the workpiece, the axial force denoted $F_a$ is exerted on the tool 16. This axial force causes an axial displacement of the rotor 13 against the force of the elastic bellows 35, since the shaft 14 is retained in an axially sliding manner in the first, lower radial rolling bearing 22 and its upper shoulder 33 pushes the second, top radial rolling bearing 32 up, together with slider 29. Because the bellows 35 is braced, by means of the force sensor 64, against the end surface 36 of the stator 11, or the stator 11 as a whole is braced by means of the force sensor 64' against the machine tool 12, the axial force $F_a$ is continuously monitored.

In the parameter stage 63, nothing further now occurs up to a predefinable limit, since up to the said limit no additional support measures in the axial direction are required. However, as soon as the said limit is exceeded, a magnetization current $I_M$ is delivered to the magnetic bearing 51 via the control unit 60. The effect of the magnetization current $I_M$ is to create in the magnet coil 51 a magnetic field that is configured precisely so that the permanent magnet 54 is attracted by the magnet coil 51. As a result there occurs in the magnetic bearing 50 an axial counterforce that acts in the opposite direction to the axial force $F_a$.

As an alternative to this, however, any desired control value can be predefined by means of the voltage $U_S$ via the first input 61 of the control unit 60, for example if, because a specific machining process is being used, the operative axial forces $F_a$ are known in any case; and thus without any measurement or even regulation, a suitable magnetization current $I_M$ is applied as soon as the tool 16 contacts the workpiece (or even at any other time).

In this instance the provision of a force sensor and/or a parameter stage is optional.

It is obvious that the invention is not confined to the practical example illustrated. For example, the magnetic bearing 50 can also be arranged, rather than at the lower end (in the FIGURE) of shaft 14, in the vicinity of its upper end; or two magnetic bearings can be located spaced apart from one another. Drive methods other than the electrodynamic drive illustrated in the FIGURE are also possible, for example by means of a turbine. Lastly, the dimensions and other engineering details shown can also be replaced, in the context of the ability of one skilled in the art, by other engineering features and dimensions.

What is claimed is:

1. A high-speed rotary spindle of a drilling or milling machine tool, comprising:

a stator fixedly attached to a stationary portion of said machine tool and having first drive means;

a rotor adapted to be rotated about an axis of rotation relative to said stator at high revolutional speeds, said rotor having second drive means cooperating with said first drive means on said stator for effecting rotation of said rotor, said rotor, further, having chucking means for chucking a milling or drilling tool therein;

a first roller bearing arranged between said rotor and said stator adjacent said chucking means, said first roller bearing having a very small thrust angle for making said first roller bearing acting essentially as a radial bearing during operation of said spindle;

a second roller bearing arranged between said rotor and said stator distant from said chucking means, said second roller bearing having a very small thrust angle for making said second roller bearing acting essentially as a radial bearing during operation of said spindle;

said first and second bearings allowing limited axial movement of said spindle and providing substantially all of the radial support for said spindle;

a magnetic bearing being arranged between said rotor and said stator, said magnetic bearing being adjustable with respect to an axial bearing force;

detector means for detecting axial force ($F_a$) exerted on said tool; and control means for adjusting said axial bearing force as a function of the detected axial force ($F_a$).

2. The spindle of claim 1, wherein said first roller bearing adjacent said chucking means is configured as a fixed bearing, and said second roller bearing distant from said chucking means is configured as a movable bearing, relative to said stator, said second roller bearing being biassed against said stator by an elastic element.

3. The spindle of claim 2, wherein said elastic element is a spring.

4. The spindle of claim 2, wherein said elastic element is configured as a bellows.

5. The spindle of claim 1, wherein said detector means comprises a sensor, said sensor being connected via a weighing stage to a control unit for abrading said magnetic bearing, said control unit applying a bearing force oriented opposite to said axial force ($F_a$), when said axial force ($F_a$) exceeds a predetermined axial force threshold value.

6. The spindle of claim 5, wherein said bearing force is increased proportionally with said axial force ($F_a$) after said axial force threshold value is exceeded.

* * * * *